Jan. 14, 1964 J. L. BYRD 3,117,490
PHOTOGRAPHIC EXPOSURE METER
Filed Feb. 13, 1961 2 Sheets-Sheet 1

JOSEPH L. BYRD
INVENTOR.

BY
ATTORNEYS

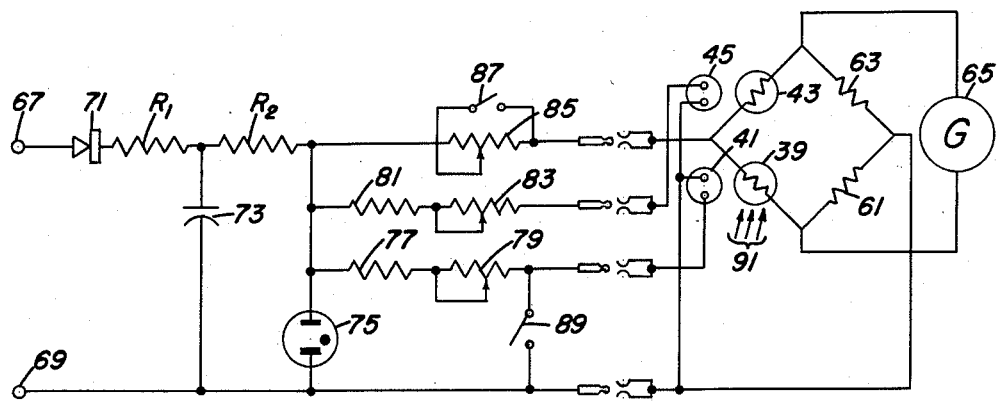
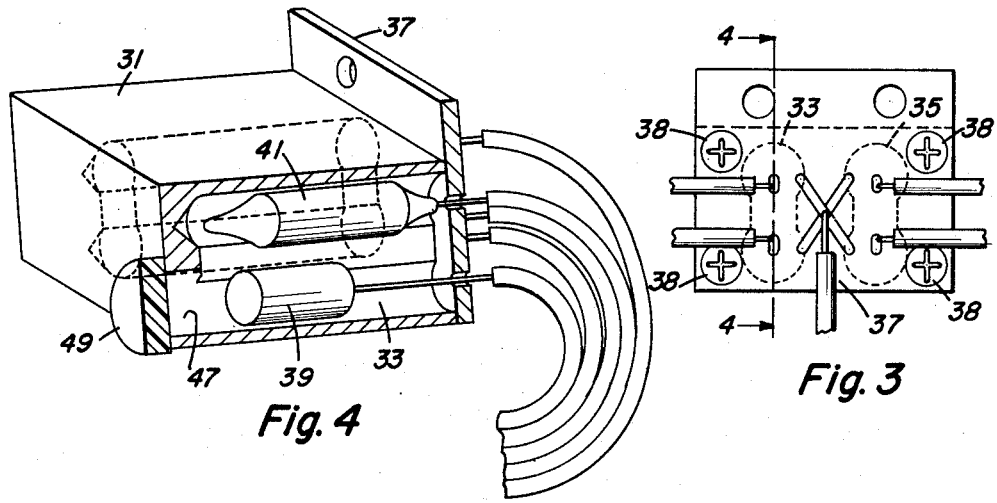

United States Patent Office 3,117,490
Patented Jan. 14, 1964

3,117,490
PHOTOGRAPHIC EXPOSURE METER
Joseph L. Byrd, Columbus, Ohio, assignor to Eastman Kodak Company, Rochester, N.Y., a corporation of New Jersey
Filed Feb. 13, 1961, Ser. No. 88,886
5 Claims. (Cl. 88—24)

This invention relates to a photographic exposure meter and more particularly to an exposure meter which may be operatively arranged in a document photographing apparatus at a fixed position spaced from the document to be copied.

The exposure meter of the present invention as illustrated in the drawings and described herein is mounted in a planetary-type document copying apparatus hereinafter referred to as a microfilmer, but it will be readily apparent to those skilled in the art that the exposure meter could be used in various other kinds of apparatus where an indication of the level of illumination of an object is desired. Exposure meters utilizing photo-voltaic cells have been incorporated for illumination sensing purposes in some of the known microfilmers. However, because of their limited sensitivity the photo-voltaic cells must be mounted for movement to a position at which they are superposed in closely spaced relation to the illuminated object in order to obtain a useful reading. Thereafter the operator must re-position the exposure meter so that it does not appear in the recorded photograph and obscure information which is contained in or on the object being photographed. Thus, in addition to the operator-dexterity involved in properly positioning the exposure meter for a correct reading the operator must remember to re-position the meter after taking a reading.

The advantages of an exposure meter which could be mounted in a fixed position in the microfilmer are apparent. If photo-voltaic cells are used it is necessary to utilize some method of light amplification because those cells lack the sensitivity which would be required to detect and differentiate the small and different illumination levels that are sensed by the cells when mounted at what would be a desirable stationary position in the microfilmer. While a number of such arrangements have been investigated, no wholly satisfactory combination was found. Photo-multiplier tubes are subject to considerable drift due to temperature fluctuations and D.C. amplifiers are not used because they are costly. It is well known that photo-conductive cells display sensitivities on the order of one-hundred times that of the photo-emissive type cells but are characterized by high temperature sensitivity, light level accommodation, and polarization when operated on a direct current. The term polarized as used herein refers to the charges built up on the cells by the electrons when a unidirectional current is continuously passed through the cells. The term accommodated as used herein refers to the characteristic of the cells to respond uniformly to a given illumination level only when the cells have been illuminated prior thereto for a period of time sufficient for the cells to have reached stable operation. In order to utilize such photo-conductive cells in a meter which can be mounted in a fixed position in a microfilmer and spaced from the plain object to be photographed, novel circuits and structures are required. The photographic exposure meter of the present invention can be mounted in such a fixed position in a microfilmer and comprises according to one aspect of the invention two photo-conductive cells which are mounted as opposed resistance elements in an electrical bridge circuit, one of the cells being positioned to measure the light reflected from a plain object, means for illuminating the other of the cells to provide a predetermined reference resistance in the bridge circuit, and means for illuminating said one cell when the object is not being illuminated to thereby maintain both cells in an accommodated state at all times. According to another aspect of the invention, the exposure meter comprises a photo-conductive tube for measuring light reflected by an illuminated surface and means for irradiating the cell with a substantially constant flux of radiant energy during the time the cell is not measuring said reflected light to maintain the cell in an accommodated state.

The primary object of the invention is, therefore, to provide in an apparatus for photographing relatively plain objects, an exposure meter adapted to be mounted in a fixed position relatively remote from the object for indicating when the level of illumination of the object is reached for providing a correct exposure thereof.

Another object of the present invention is to provide in a photographic apparatus for copying documents or other plain objects, an exposure meter comprising at least one photoconductive cell and means for maintaining the cell in an accommodated state at all times.

Yet another object of the present invention is to provide in a photographic apparatus for copying documents or other plain objects, an exposure meter adapted to be mounted in a fixed position relatively remote from the object and comprising two photo-conductive cells which form opposed resistance elements in a direct current operated electrical bridge circuit and are mounted so that the field of one is limited to a portion of the object to be copied, means for balancing the bridge circuit when the level of illumination of the object is sufficient to provide a correct exposure and means for maintaining the cells in a polarized and accommodated state at all times.

Still other objects and advantages of the present invention will become readily apparent to those skilled in the art from the following description with reference to the drawings in which like characters denote like parts and wherein:

FIG. 3 is an end elevation view of the exposure meter of the present invention;

FIG. 4 is an enlarged perspective view partly in section looking in the direction of the arrows 4—4 of FIG. 3; and FIG. 5 is a schematic wiring diagram of the exposure meter.

Figure 1:
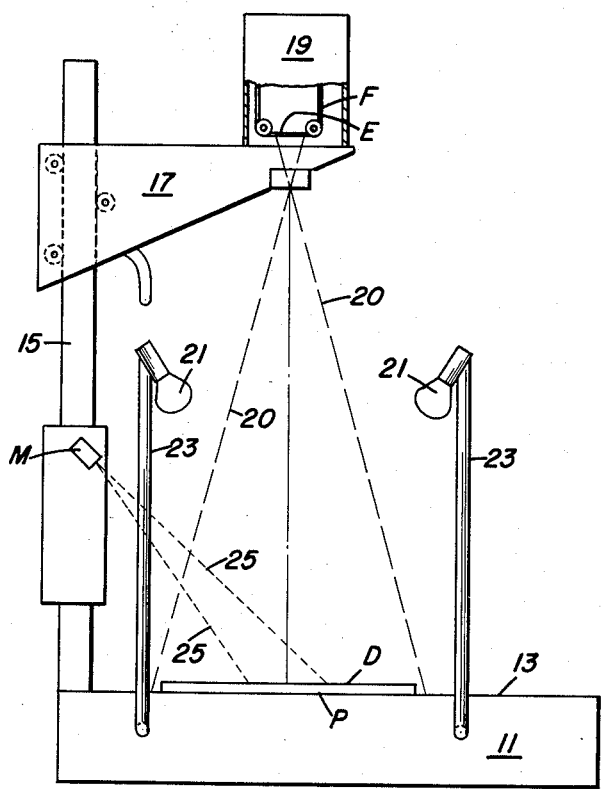
FIG. 1 is an elevation view of a planetary-type microfilmer incorporating the exposure meter of the present invention in a fixed position relatively remote from the document to be copied.

Referring to FIG. 1, the planetary-type document photographing apparatus (microfilmer) comprises a platen 11 having a surface 13 for supporting plain objects such as books, letters, checks, or other documents, for photographing, a support 15, a bracket 17 mounted for vertical movement on the support 15, and a film unit 19. The plain object, for example, document D, is positioned on surface 13 of the platen 11 within the photographic field of the film unit 19. The photographic field as indicated in FIG. 1 includes the area between the dashed lines 20 and will be hereinafter referred to as the photographing station P. The film unit includes suitable lens for focusing an image of the document D onto the film strip F. The area on the strip F between the dashed lines 20 at which the image is recorded will be hereinafter referred to as the exposure station and is designated in FIG. 1 by the character E. Illumination for the document D is provided by four or more lamps 21 which are supported in proper relation to the photographing station P on arms 23. The intensity of illumination, i.e., brilliancy, of lamps 21 is regulated through a rheostat (not shown) by the operator. The control for the rheostat may be conveniently placed on the front face of platen 11 or other accessible spot remote from the microfilmer. The exposure meter of the present invention which is designated by the character M is mounted in a fixed position on support 15 completely without the photographing station P. The field measured by the exposure meter M includes the area in the photographing station P between the dashed lines 25. The extent and/or exact position of the field which is measured by the exposure meter can be selected and controlled by conventional means all well known in the art.

Figure 2:
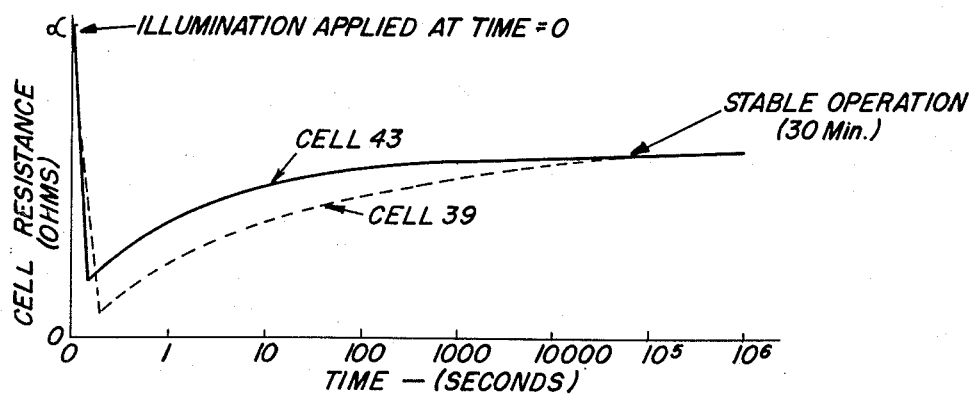
FIG. 2 is a plot of cell resistance versus time which illustrates the response of two similar photo-conductive cells to a given level of illumination, which cells have not been maintained in a polarized and accommodated state in accordance with the present invention.

Because photo-conductive cells have a temperature sensitivity of about 1 percent resistance change per degree Fahrenheit temperature variation, it is necessary to mount the cells in an electrical bridge circuit using one cell as a reference resistance and adjusting the bridge circuit to balance when the illumination of the document as sensed by the other cell is such that a correct exposure of the document will be made. When the photo-conductive cells were so mounted in the electrical bridge circuit it was found that the resistance of the cells to a predetermined level of illumination varied as indicated in FIG. 2. Stable operation was achieved in about 30 minutes. This phenomenon was noticed only when the apparatus was first turned on after substantial periods of non-use and, although the bridge circuit tended to compensate for this difference due to the differences in the individual cells loss of conductance, an error was detected during this 30-minute period. In order to eliminate this error it was found necessary to maintain both cells in a polarized and accommodated state at all times.

The exposure meter M as shown in FIGS. 3 and 4 comprises a metal housing 31 having two individual compartments 33 and 35 which are closed by end plate 37. Plate 37 is secured to the housing by means of the screws 38. Each compartment is made sufficiently large to receive both a photo-conductive cell and a neon lamp. Thus, compartment 33 contains photo-conductive cell 39 and neon lamp 41 and compartment 35 contains photo-conductive cell 43 and neon lamp 45. The lamps 41 and 45 illuminate cells 39 and 43, respectively, as will be hereinafter more fully set forth. An aperture 47 is provided in the end of housing 31 in communication with compartment 33 to confine the field measured by cell 39 to the predetermined portion of the area of the photographing station P. The numeral 49 designates a color correction filter which is selected to match the spectral response of cell 39 to the light reflected from the illuminated document D, to the spectral response of film F in the film unit 19. The end plate 37 includes a series of small holes which permit the electrical lead connections to be made to the photo-conductive cells and neon lamps which are mounted within the housing 31.

As illustrated in FIG. 5, cells 39 and 43 are interconnected as opposed resistance elements in a bridge circuit. Resistors 61 and 63 in the bridge circuit each have the same resistance and are selected to approximately match the resistance of the cell 39 for optimum sensitivity. The galvanometer 65 is used to indicate when the bridge circuit is balanced. The current from an alternating current source (not shown) which is connected to terminals 67 and 69 is rectified by the rectifier 71 and filtered by capacitor 73. The unidirectional voltage is regulated by voltage regulator tube 75. Neon lamps 41 and 45 are connected across tube 75 through resistors 77, 79 and 81, 83, respectively, the resistance of resistors 79 and 83 being adjustable to provide the desired current flow through the lamps. A variable resistor 85 which includes a shorting switch 87 is provided for selectively controlling the sensitivity of cells 39 and 43. Switch 89 is connected across lamp 41 and operates simultaneously and in conjunction with the switch, (not shown) which controls the turning on and off of the document illuminating lamps 21 so that when the lamps 21 are energized switch 89 is closed, thus extinguishing the lamp 41, and when lamps 21 are extinguished switch 89 is opened and lamp 41 is again energized. In FIG. 5, the light from lamps 21 which is reflected from document D and sensed by cell 39 is indicated by the arrows 91.

The following are illustrative of the components and their values which have been found to work satisfactorily in one given installation but it is appreciated that other components having different characteristics might be advantageously utilized in other applications:

| | |
|---|---|
| 39 and 43 | Clairex CL-6.04. |
| 41 and 45 | NE-81. |
| 61 and 63 | 100K ohms. |
| 69 | OB-2. |
| 71 | Mallory T-400. |
| 73 | 10 microfarads. |
| 77 | 470K ohms. |
| 79, 83, 85 | 5 megohms. |
| 81 | 1.2 megohms. |
| $R_1$ | 220 ohms. |
| $R_2$ | 6.8K ohms. |

The operation of the exposure meter of the present invention as it is used in a microfilmer will now be described.

It is assumed that the circuit components have been selected to balance the bridge circuit when the document D is correctly illuminated by lamps 21 to a level at which a correct exposure will be made of the document. First, the operator places document D in the photographing station P and turns on the lamps 21. This simultaneously extinguishes lamp 41 and the intensity of the illumination reflected from document D is sensed by cell 39. The operator adjusts the brilliancy of lamps 21 until the galvanometer 65 indicates that the bridge circuit is balanced. The microfilmer is actuated to photograph the document. Next lights 21 are extinguished until the next document is properly located in the photographing station P on platen 11. Upon extinguishing lights 21 the lamp 41 is energized and it continues to illuminate cell 39 until the lights 21 are turned on again. Thereafter, cell 39 is illuminated by the light reflected from the document in the photographing station. Since lamp 45 is energized all the time it will be seen that lamps 41 and 45 maintain both cells 39 and 43, respectively in an accommodated state so that their response to a given level of illumination will be substantially uniform at all times. Since the cells 39 and 43 are mounted within a metal block both cells are maintained at substantially the same temperature during operation and are shielded from quick changes in temperature as might be caused by circulating air currents, thereby further assuring uniform response of the two cells.

It now will be apparent that the exposure meter of the present invention can be operatively mounted in a fixed position relatively remote from the illuminated plain object to be copied and comprises at least one photo-conductive cell which is maintained in a polarized and accommodated state at all times to indicate uniformly the illumination level of each document necessary for a correct exposure thereof. While only one embodiment of the present invention has been specifically illustrated and described it is realized that many modifications and variations are possible and will be readily apparent to those skilled in the art from the foregoing description which is intended, therefore, to be illustrative only and the scope of the invention is defined in the appended claims.

Having now particularly described my invention what I desire to secure by Letters Patent of the United States and what I claim is:

1. An exposure meter for use in document photographing apparatus having a photographing station for receiving documents, means for illuminating the document when in said photographing station, means for varying the intensity of and for extinguishing such illuminating means, and an exposure station for receiving a document image recording media to record an image of each illuminated document, said exposure meter comprising an electrical bridge circuit for comparing resistances, two photo-conductive cells operatively interconnected in said bridge circuit and forming opposed resistance elements therein, means for confining the field measured by one of said cells to a given area of the photographing station, means for irradiating said cells with a substantially constant flux of radiant energy to maintain said cells in an accommodated state, means rendering said irradiating means effective with respect to said one cell only when said document illuminating means is extinguished, means for balancing said bridge circuit when the intensity of illumination of a document in said photographing station as measured by said one cell is sufficient to provide correct exposure for photographing such document on said recording media, and means for indicating when said bridge circuit is balanced.

2. An exposure meter in accordance with claim 1 and comprising a housing for substantially enclosing said cells, said housing being made of metal so as to conduct heat evenly and quickly therethrough whereby said cells are maintained at substantially like temperatures at all times.

3. An exposure meter in accordance with claim 2 and wherein said housing is formed with individual compartments for respectively receiving said cells, and said irradiating means comprises two illuminating devices contained respectively in said compartments adjacent to the cells therein.

4. An exposure meter in accordance with claim 3 and wherein each of said illuminating devices is a gas filled electron discharge tube and said confining means includes a filter for substantially matching the spectral response of said one cell to that of said recording media.

5. An exposure meter for use in document photographing apparatus having:
   (a) a photographing station for receiving documents,
   (b) means for illuminating a document when in said photographing station,
   (c) means for varying the intensity of and for extinguishing said illuminating means, and
   (d) an exposure station for receiving a document image recording media to record images of illuminated documents, said exposure meter comprising:
   (1) two photoconductive cells have electrical resistances which vary directly as the flux of radiant energy that impinges thereon, one of said cells being disposed to sense the intensity of illumination on a predetermined area only of a document in said photographing station, and the second of said cells being substantially enclosed within a housing so that light from the environs is excluded from said second cell,
   (2) means for irradiating said second cell with a substantially constant flux of radiant energy to
      (a) maintain said second cell in an accommodated state, and
      (b) adjust the resistance of the second cell to correspond to the resistance of said one cell when sensing that intensity of illumination on a document which is sufficient to provide a correct exposure for photographing the document on said recording media,
   (3) means effective only when said document illuminating means is extinguished for irradiating said one cell with a substantially constant flux of radiant energy to maintain the cell in an accommodated state,
   (4) means for comparing the resistance of said one cell when sensing the illumination on a document to that of said second cell, and
   (5) means for indicating when the compared resistances of said cells bear a predetermined relation to each other, thereby indicating correct document illumination.

References Cited in the file of this patent

UNITED STATES PATENTS

| | | |
|---|---|---|
| 1,794,222 | Whitney | Feb. 24, 1931 |
| 2,096,323 | Gille | Oct. 19, 1937 |
| 2,353,218 | Burnham et al. | July 11, 1944 |
| 2,794,366 | Canaday | June 4, 1957 |
| 2,968,946 | Goldberg et al. | Jan. 24, 1961 |